(12) United States Patent
Chan (10) Patent No.: US 9,127,795 B2
(45) Date of Patent: Sep. 8, 2015

(54) CONDUIT JOINING APPARATUS

(76) Inventor: Sun Chan, Ingleburn (AU)

( * ) Notice: Subject to any disclaimer, the term of this patent is extended or adjusted under 35 U.S.C. 154(b) by 349 days.

(21) Appl. No.: 12/593,671

(22) PCT Filed: Mar. 28, 2008

(86) PCT No.: PCT/AU2008/000442
§ 371 (c)(1),
(2), (4) Date: Sep. 29, 2009

(87) PCT Pub. No.: WO2008/119112
PCT Pub. Date: Oct. 9, 2008

(65) Prior Publication Data
US 2010/0117360 A1 May 13, 2010

(30) Foreign Application Priority Data
Mar. 30, 2007 (AU) ................. 2007901708

(51) Int. Cl.
*F16L 21/08* (2006.01)
*F16L 21/06* (2006.01)
*F16L 21/00* (2006.01)
*F16L 27/10* (2006.01)
*F16L 37/12* (2006.01)

(52) U.S. Cl.
CPC .............. *F16L 21/06* (2013.01); *F16L 21/005* (2013.01); *F16L 21/08* (2013.01); *F16L 27/1017* (2013.01); *F16L 37/1225* (2013.01)

(58) Field of Classification Search
CPC ......... F16L 21/06; F16L 21/08; F16L 21/005; F16L 37/1225; F16L 27/1017
USPC ......... 285/364, 365, 406, 407, 411, 413, 420, 285/373, 419, 91, 913
See application file for complete search history.

(56) References Cited

U.S. PATENT DOCUMENTS

| | | | |
|---|---|---|---|
| 565,698 A * | 8/1896 | Sparks | 24/25 |
| 3,435,823 A * | 4/1969 | Edwards | 606/153 |
| 4,260,181 A * | 4/1981 | Curtin | 285/15 |
| 4,527,818 A * | 7/1985 | Rundell | 285/148.17 |
| 4,967,800 A * | 11/1990 | Heilmayr et al. | 138/162 |
| 5,620,210 A | 4/1997 | Eyster et al. | |
| 5,647,612 A * | 7/1997 | Yoshida et al. | 285/13 |
| 5,823,581 A * | 10/1998 | Coppolo | 285/373 |
| 5,871,239 A | 2/1999 | Boscaljon et al. | |
| D576,260 S | 9/2008 | Chan | |
| 2004/0061329 A1 | 4/2004 | Guest | |

FOREIGN PATENT DOCUMENTS

| | | |
|---|---|---|
| DE | 3817714 A | 12/1989 |
| GB | 2113790 A | 8/1983 |
| JP | 52-118419 | 9/1972 |

(Continued)

*Primary Examiner* — David E Bochna
*Assistant Examiner* — James Linford
(74) *Attorney, Agent, or Firm* — Richard M. Goldberg (57) ABSTRACT

Apparatus for joining a first conduit to a second conduit comprising a first coupler for attachment to an end of the first conduit, a second coupler for attachment to an end of the second conduit and for engagement to the first coupler, and a snap-fit fastener for fastening the first coupler to the second coupler. The snap-fit fastener is arranged in at least two portions to fit around the periphery of the first and second couplers when the first and second couplers are engaged. The apparatus enables relative movement between the first coupler and the second coupler.

10 Claims, 8 Drawing Sheets

(56) References Cited

FOREIGN PATENT DOCUMENTS

| | | | |
|---|---|---|---|
| JP | 58-184087 | U | 12/1983 |
| JP | 60-31581 | U | 3/1985 |
| JP | 61-70290 | A | 4/1986 |
| JP | 61-181185 | U | 11/1986 |
| JP | 62-138983 | U | 9/1987 |
| JP | 10-148286 | A | 6/1998 |
| JP | 2002-48277 | A | 2/2002 |
| JP | 2004-32477 | A | 11/2004 |
| WO | 99/50583 | A | 10/1999 |

* cited by examiner

FIG. 7

CONDUIT JOINING APPARATUS

CROSS-REFERENCE TO RELATED APPLICATIONS

The present application claims priority from Australian Provisional Patent Application No 2007901708 filed on 30 Mar. 2007, the content of which is incorporated herein by reference.

FIELD OF THE INVENTION

This invention relates to an apparatus used to join conduits and more particularly relates to apparatus for joining a pair of pipes.

BACKGROUND OF THE INVENTION

Presently conduits, such as pipes are joined either by welding or gluing the ends of the pipes to each other. Other pipe joining arrangements have used a clamp or collar at the junction between the two pipes which ultimately have to be welded or glued or otherwise adhered in some fashion to ensure the pipes remain attached.

When vibrations occur due to passing fluid, either liquid or gas, within the pipes, sometimes under pressure, this can weaken and in some instances rupture the join between the pipes as there is no possible movement between the pipes to counteract or make allowances for such vibrations.

It is desirable to provide a pipe joining apparatus that enables an amount of movement between the pipes or conduits to be joined so that the join can absorb any amount of vibration that is present in transporting the fluid within the pipes through the join.

The present invention seeks to address one or more of the above disadvantages by providing such a conduit joining apparatus. In some instances it reduces the amount of welding and gluing that needs to be done with existing pipe joining apparatus and methods. It is also desirable to provide joining apparatus that is easier to install than previous arrangements and to be able to reuse some or all of the joining apparatus.

SUMMARY OF THE INVENTION

According to a first aspect of the invention there is provided apparatus for joining a first conduit to a second conduit comprising:

a first coupler for attachment to an end of the first conduit;

a second coupler for attachment to an end of the second conduit and for engagement to the first coupler;

a snap-fit fastener for fastening the first coupler to the second coupler, the snap-fit fastener arranged in at least two portions to fit around the periphery of the first and second couplers when the first and second couplers are engaged;

wherein the apparatus enables relative movement between the first coupler and the second coupler.

The fastener preferably is able to move relative to each of the first and second couplers.

Preferably the conduits are cylindrical and each of the first coupler, second coupler and fastener are substantially circular in axial cross-section. Therefore each of the portions or halves of the fastener, denoted first half and second half, are preferably substantially semi-circular in axial cross-section.

The first coupler is preferably a female coupler for receiving the second coupler which is preferably a male coupler. Each coupler may have an internal circumferential step to set a limit for abutment of the respective end of each conduit as the conduit is attached to the coupler. The conduit may be attached to the respective coupler by any means such as welding, soldering, gluing or by co-operating threaded portions on the conduit and on the coupler.

Where the fastener is formed in two substantially identical halves, it preferably has two locking arrangements that snap-fit the two halves of the fastener together. Each locking arrangement preferably comprises a male component and a female component, such that at one end of each half there is disposed a female component and at the other end of each half there is disposed a male member. Thus the male member of one half interlocks with a female member of the other half to snap-fit and lock the fastener around the couplers. The female member may have a slot substantially shaped to fit the corresponding male member. The male member may be shaped in a T-formation or an arrowhead or any other shaped projection.

In order to apply the fastener to the engaged couplers, the two halves are locked with one of the locking arrangements. Thereafter the fastener is applied by hand or fingers of a user around the periphery of the engaged couplers until the male member of the second locking arrangement is next to a corresponding female member. Pressure is applied to the male member to ease it over or under the female member until the male member snap-fits into the slot of the female member.

The apparatus may further comprise a locking pin adapted to have each end thereof fit into one or both of the female members of the two locking arrangements and traverse the female members so as to prevent separation of each locking arrangement due to vibrations or pressure due to the transport of fluid within the conduits.

The second male coupler preferably has one or more circumferential grooves for housing a respective sealing ring to prevent escape of any fluid from the first or second conduits and to absorb any vibrations created by the passage of fluid within the first and second conduits.

When engaged, the first and second coupler preferably present an exterior surface that has a raised portion for co-acting with the interior surface of the fastener. The fastener preferably has a depending foot portion formed at each circumferential edge of the fastener, with each depending foot portion engaging a respective edge of the raised portion and a respective shoulder on each of the first and second couplers. This assists in the fastener securing the first coupler to the second coupler.

BRIEF DESCRIPTION OF THE DRAWINGS

A preferred embodiment of the invention will hereinafter be described by way of example only, with reference to the drawings wherein.

DETAILED DESCRIPTION OF THE PREFERRED EMBODIMENTS

Referring to FIGS. 1, 1A to 1E and 2A to 2D there is shown apparatus 2 with the components of apparatus 2 separated. The apparatus 2 includes a first coupler 4 which is a female coupler, a second coupler 6, being a male coupler, and a snap-fit fastener 8. The first coupler 4 has a chamfered circumferential ring or edge 10 that is adapted to receive internally the end of one conduit, such as a pipe and similarly the second coupler 6 has a chamfered circumferential ring or edge 12 which is adapted to receive internally the end of a second conduit such as a pipe. Each conduit is respectively adhered to the respective coupler by suitable means, such as welding, soldering or gluing. The coupler 4 has an internal step 14 that abuts against the end of the respective pipe or conduit 28 and sets a limit beyond which the pipe 28 cannot move. Second coupler 6 also has a step 16 against which the end of its respective pipe 30 abuts and sets a limit beyond which the pipe 30 cannot move.

The first coupler 4 receives the second coupler 6 whereby the inner circumferential edge 18 of coupler 6 abuts against the inner surface of step 14 in first coupler 4. Also, the inner edge 20 of first coupler 4 abuts adjacent to the inner surface of ridge 22 of the second coupler 6. After the first and second couplers 4 and 6 are brought together in close contact a snap-fit fastener 8 provides a compression fitting around the two couplers in order to keep the couplers together and therefore the respective pipes are joined to each other. A small gap exists between the circumferential edge 18 of coupler 6 and the inner surface of step 14 and also between the inner surface of the ridge 22 and the inner circumferential edge 20. This allows a small amount of movement between each of the couplers 4 and 6 so that any vibration that is caused by fluid passing through the joined pipes does not create pressure on the join, as movement is possible between the couplers 4 and 6 and therefore between the joined pipes.

Figure 3A:
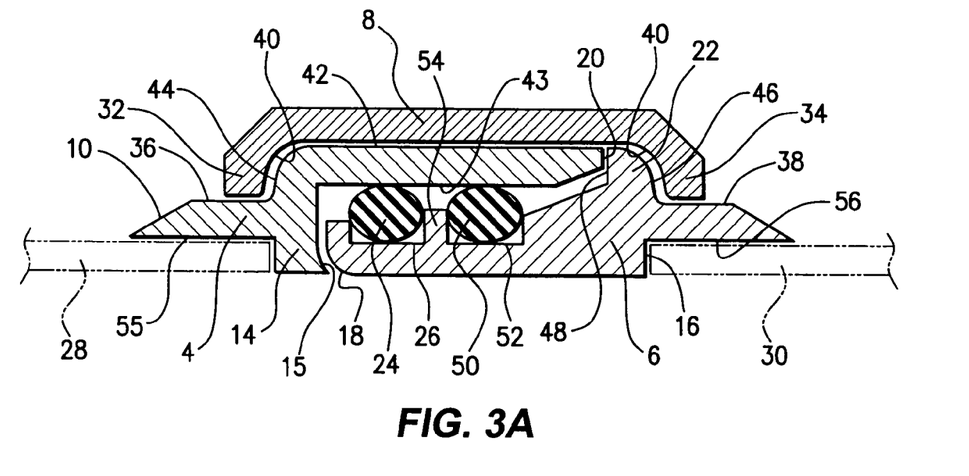
FIGS. 3A to 3C are sectional views along line A-A of FIG. 2A of different embodiments of the apparatus.

A primary sealing ring 24 fits into a groove 26 on second coupler 6 and is more clearly seen in cross-section in FIG. 3A. The snap-fit fastener 8, which acts as a retaining ring to retain the first coupler 4 to the second coupler 6, is formed by two semi-circular substantially identical portions, termed first and second halves 9 and 11. Each of the halves 9, 11 are joined by respective interlocking members, whereby a projection is adapted to fit into a slot in a snap-fit arrangement. Preferably each half of the snap-fit fastener 8 has at one end a male member and at the other end a female member so that the male member of one half is adapted to fit the female member of the other half.

Figure 1:
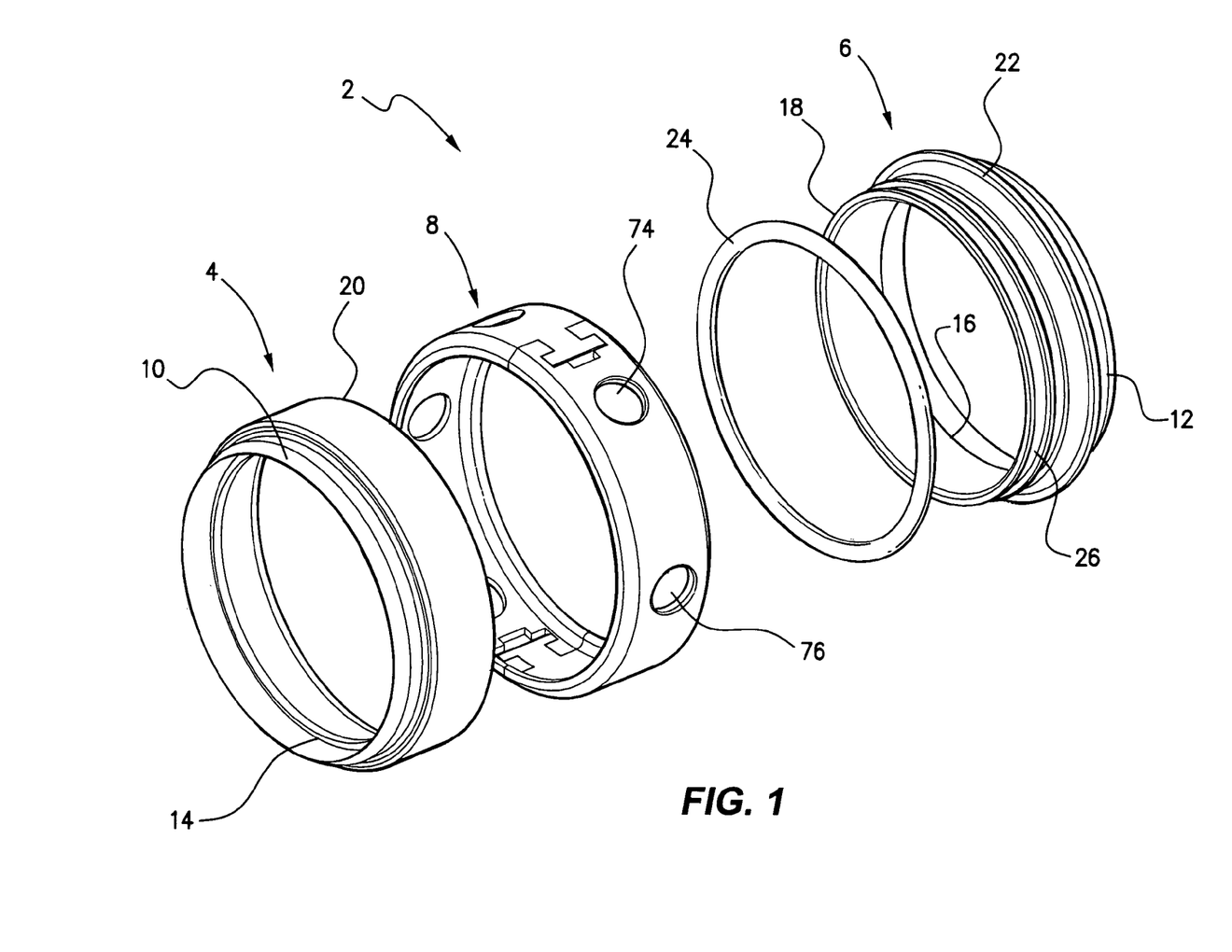
FIGS. 1, 1B and 1D are exploded perspective views of the conduit joining apparatus including first and second couplers and a snap-fit fastener.
Figures 1A, 1B:
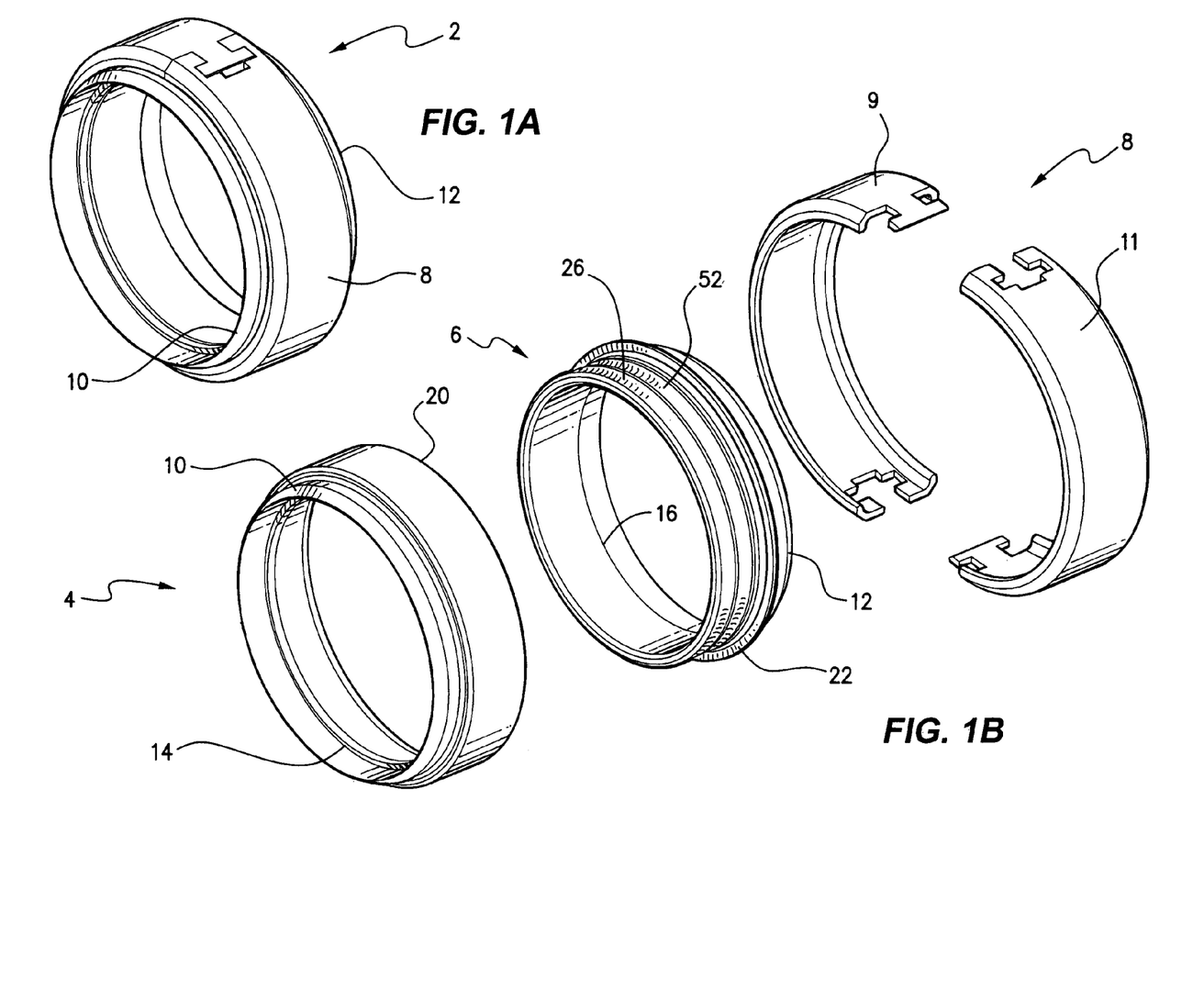
FIGS. 1A and 1C show the conduit joining apparatus with the fastener securing the first coupler to the second coupler.
Figures 1C, 1D:
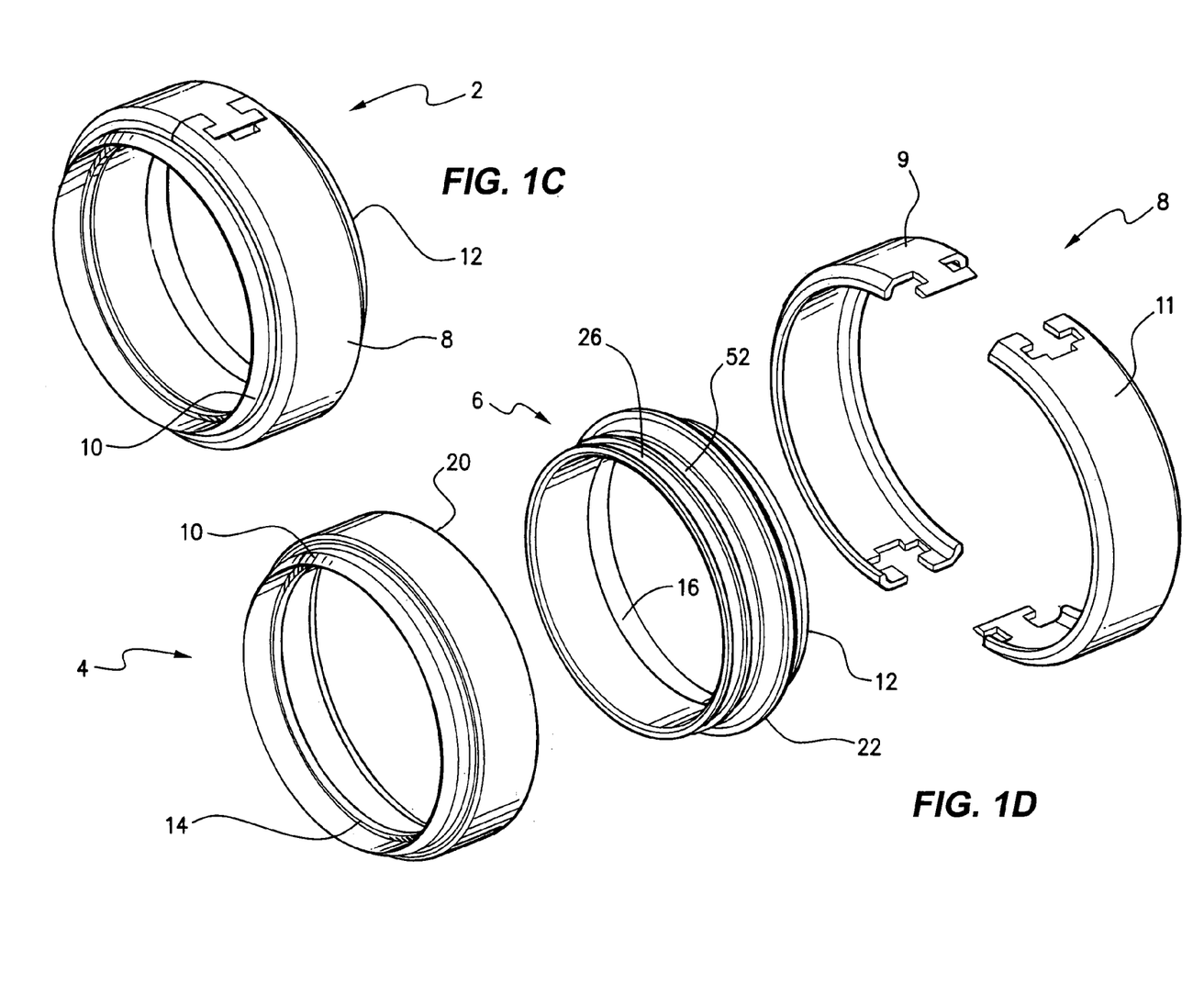
Figure 1E:
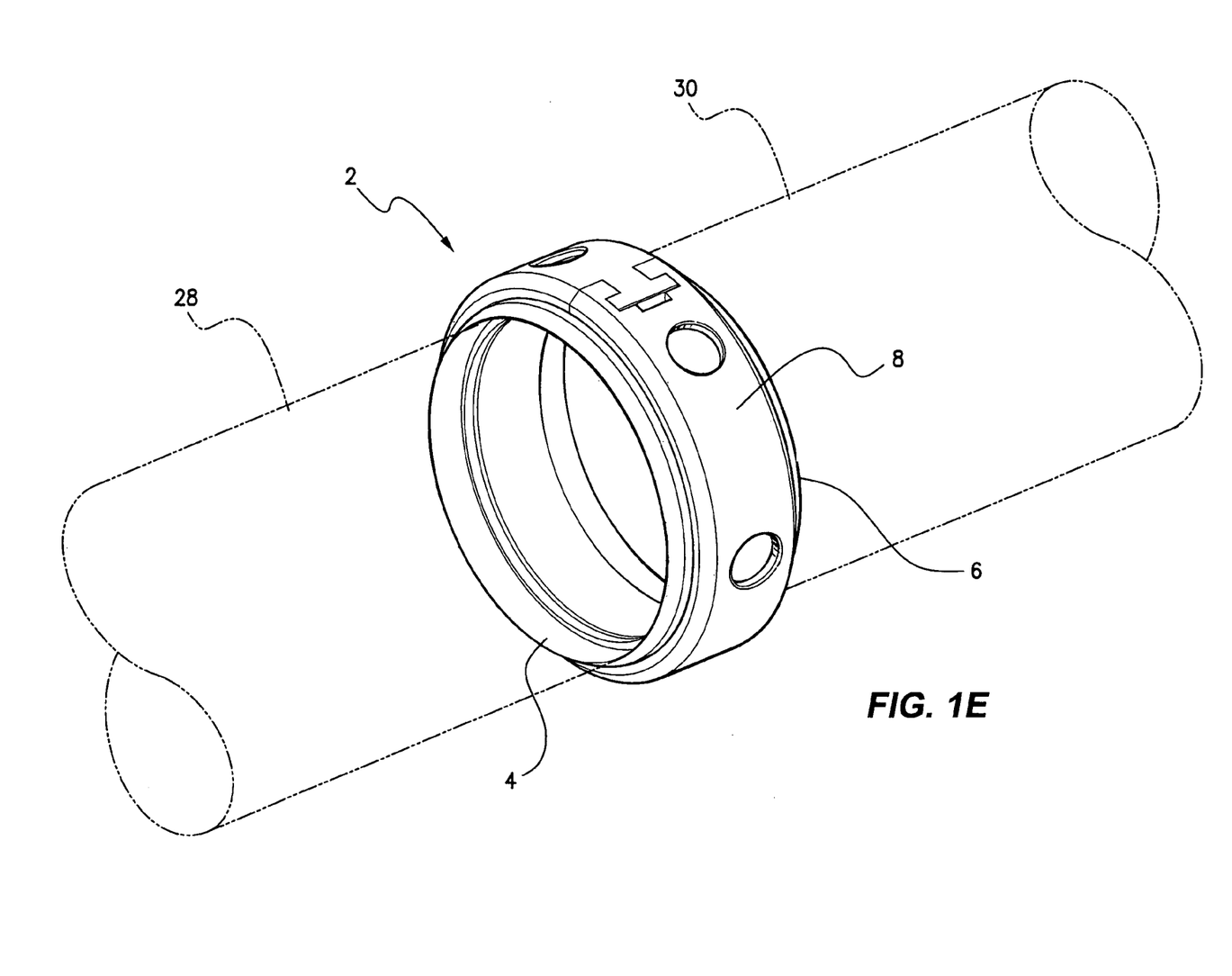
FIG. 1E shows the conduit joining apparatus of the previous Figures as used and fitted to join a pair of conduits.
Figures 2A, 2D:
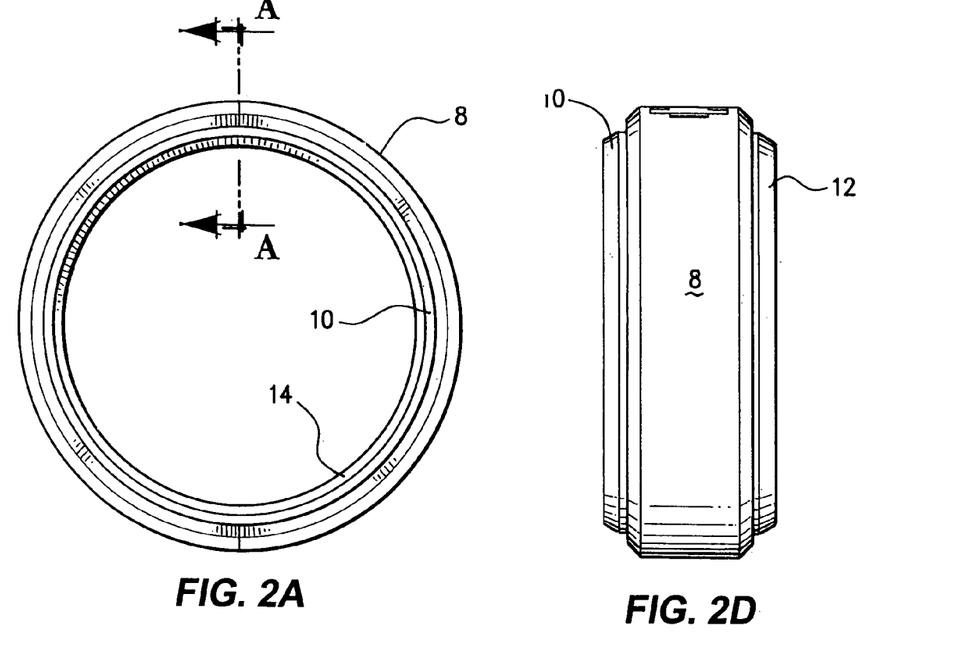
FIGS. 2A to 2D are respectively front, plan, underneath and side views of the conduit joining apparatus with the fastener securing the first coupler to the second coupler.
Figure 2B:
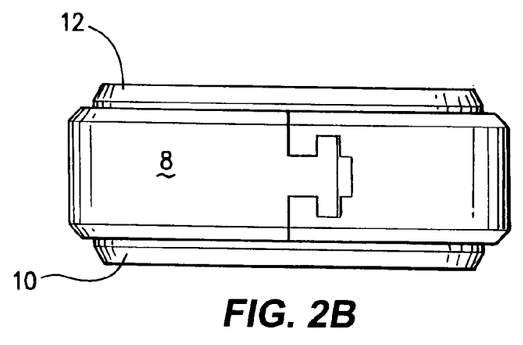
Figure 2C:
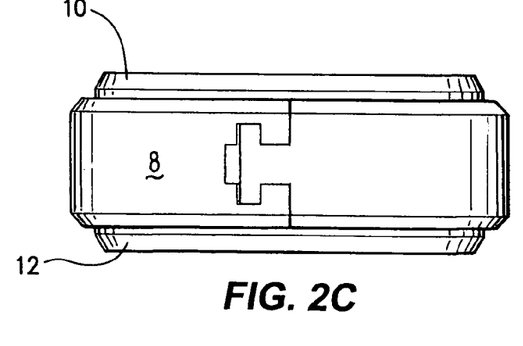

With reference to FIG. 1E (and to FIGS. 1A and 1C) there is shown the conduit joining apparatus 2 in use whereby the first coupler 4 has been fitted to second coupler 6 with the primary sealing ring 24 fitted into the groove 26. Thereafter the two halves 9, 11 of the snap-fit fastener 8 have been locked together through their respective male and female members. Shown in phantom in FIG. 1E is a first pipe 28 which is secured to first coupler 4 with chamfered or slanted outer edge 10 being external to the periphery of the conduit 28 and with the circumferential edge of the conduit 28 abutting against the step 14. It is thereafter welded to the coupler 4 or otherwise secured such as by gluing. Similarly, conduit 30 is fitted to coupler 6 whereby the outer edge of the conduit 30 abuts adjacent the inner step 16 within coupler 6 and with the chamfered or slanted external edge 12 of coupler 6 being external to the conduit 30. The conduit 30 is then secured by welding or gluing to the coupler 6. The conduit 28 and coupler 4 are then fitted to coupler 6 and conduit 30. Thereafter, the snap-fit fastener 8 is fitted over the couplers 4 and 6 whereby the internal surface of the snap-fit fastener 8 contacts the outer surface of the female first coupler 4 and ridge 22 of coupler 6.

Figure 3B:
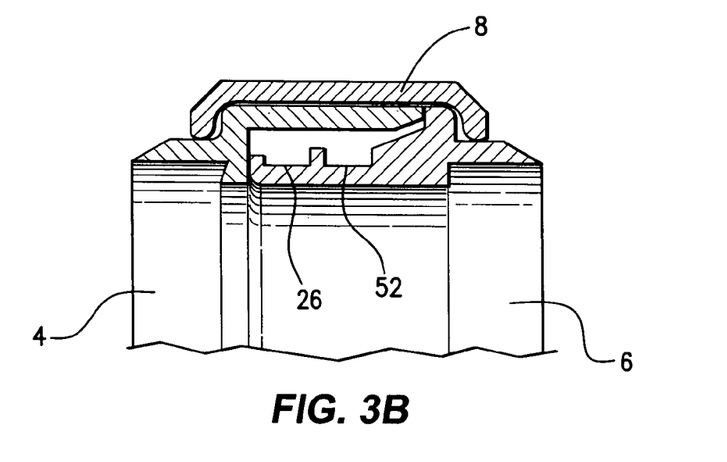
Figure 3C:
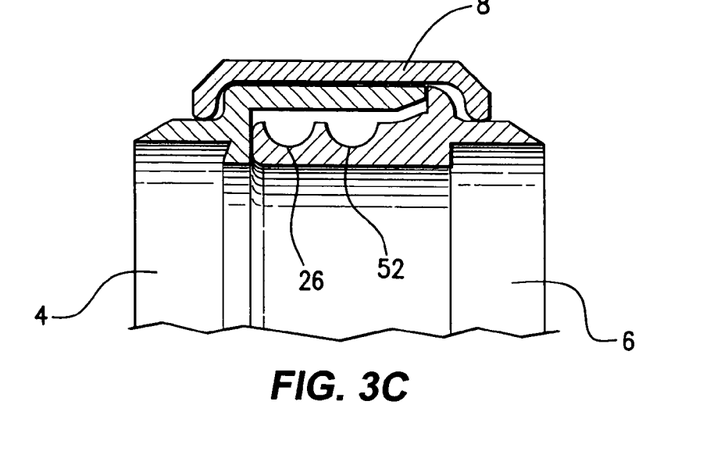

Referring to FIGS. 3A to 3C there is shown, in cross-section, each of the couplers 4 and 6 fitted to one another and secured by snap-fit fastener 8. FIG. 3A shows the sealing rings 24 and 50 fitted within square-profiled grooves 26 and 52. FIG. 3B shows the square-profiled grooves 26 and 52 without the sealing rings 24 and 50. FIG. 3C shows grooves 26 and 52 having a substantially semi-circular profile without the sealing rings 24 and 50. With particular reference to FIG. 3A, the snap-fit fastener 8 has a pair of feet 32 and 34, formed at each circumferential edge of the halves 9 and 11 of fastener 8, that respectively rest or abut against shoulders 36 and 38 of each of the couplers 4 and 6. The inner surface 40 of the snap-fit fastener 8 snugly abuts against the outer raised flat surface 42 of coupler 4 and briefly contacts the top portion of ridge 22 of coupler 6. The profile of the inner surface 40 closely follows each of the inclines 44 and 46. The feet 32 and 34 of the snap-fit fastener 8 combine to keep the couplers 4 and 6 in a relatively stationary lateral position. Each of the couplers 4, 6 are still able to move slightly in a radial position with respect to each other. Thus, the fastener 8 can move circumferentially around the couplers 4 and 6 and likewise the couplers 4 and 6 can move circumferentially with respect to each other. This is enabled via a small gap between edge 18 of coupler 6 and the inside edge 15 of step 14 and also between the edge 20 and the inside edge 48 of ridge 22.

As mentioned previously there is a primary sealing ring 24 located in groove 26 of coupler 6. A further secondary sealing ring 50 exists within groove 52 of coupler 6 with each of the grooves 26 and 52 being separated by a ridge 54. The profile of the grooves 26 and 52 may be any particular shape, such as square as shown in FIGS. 1D, 3A and 3B or can be substantially semi-circular as shown in FIGS. 1B and 3C. The sealing rings 24 and 50 also abut against an inner surface 43 of the coupler 4. Thus, any fluid leakage that occurs between the pipes 28 and 30 will be sealed by primary sealing ring 24 and backed up by secondary sealing ring 50 such that there is no escape of the fluid between the gap created between edges 20 and 48.

The internal surface 55 and 56 respectively of the couplers 4 and 6 may be threaded so that they engage corresponding end threaded portions of the pipes 28 and 30. Thus, as an alternative to welding, the pipes may be threaded into each of the couplers. The thickness of each of the conduits 28 and 30 substantially match the thickness of steps 14 and 16 so that a generally smooth surface is provided internally for a smoother flow of the fluid through the conduits 28 and 30.

Figure 4:
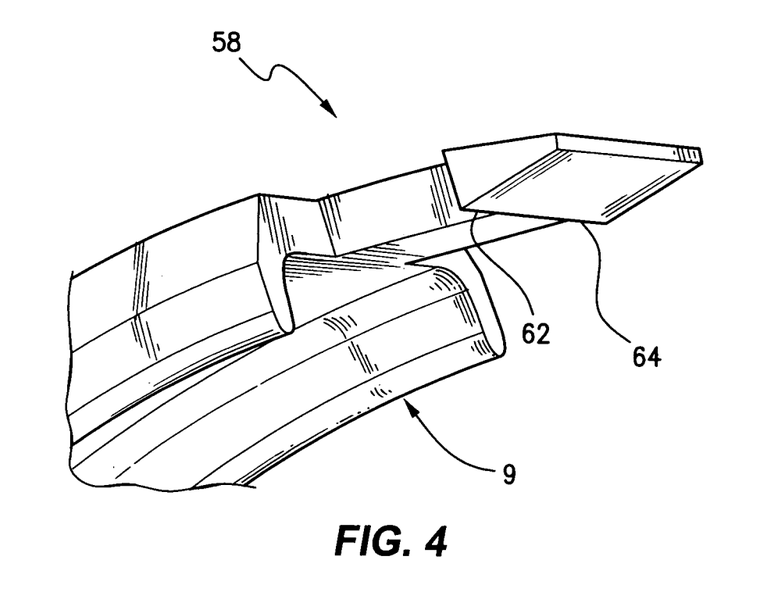
FIG. 4 is a perspective view from below of a portion of the snap-fit fastener.
Figure 5:
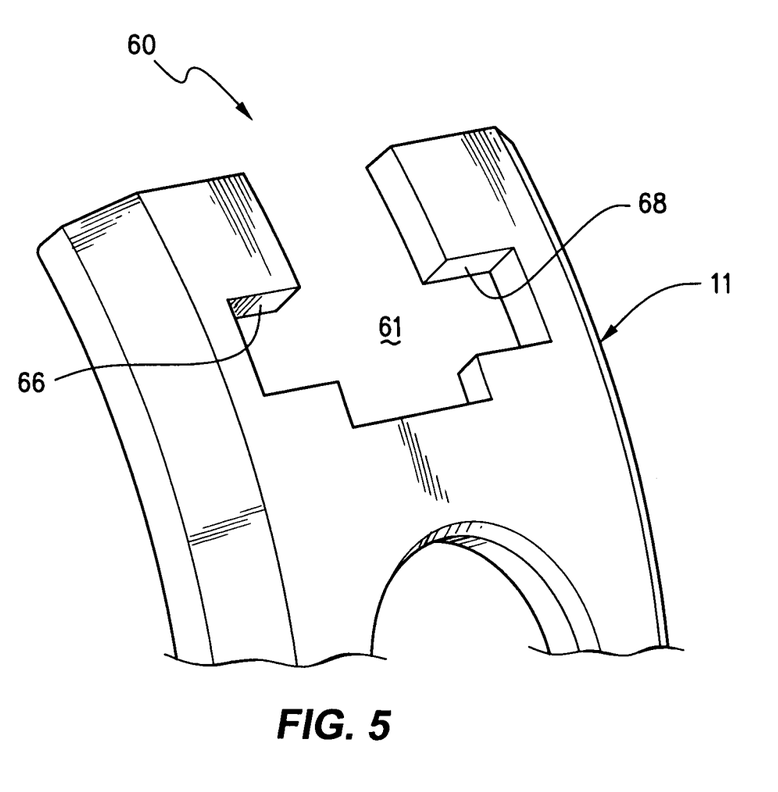
FIG. 5 is a perspective view from above of a portion of the fastener which is adapted to interact and engage in a snap-fit connection with the portion shown in FIG. 4.
Figure 7:
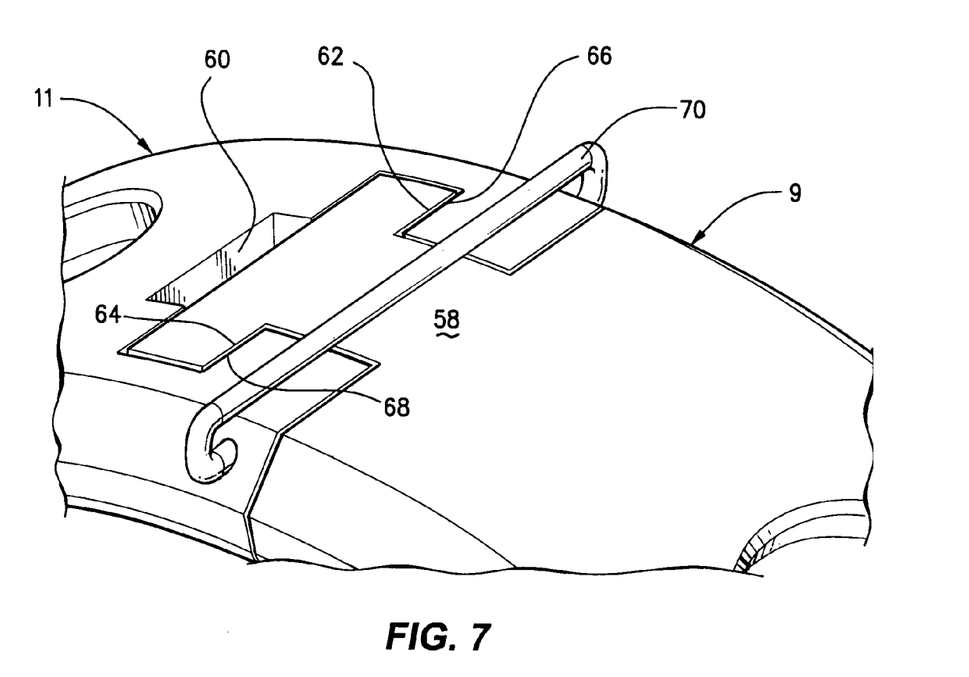
FIG. 7 is a perspective view from above showing the locking pin as fitted when the snap-fit fastener is in a usable form.

With references to FIGS. 4 and 5, there is shown a pair of members 58, 60 that form one of two locking arrangements between the two halves 9, 11 of the snap-fit fastener 8. In FIG. 4 there is shown an end of one half 9 that has a projection or male member 58 which is adapted to be received in the female member 60 having slot 61 located at one end of the other half 11 of the snap-fit fastener 8 as shown in FIG. 5. Thus, as is more clearly shown in FIG. 7 the T-portion of the male member 58 is designed to fit snugly into a corresponding T-slot or opening in the female member 60. Thus, the inner sides 62 and 64 of the member 58 abut against respective side walls 66 and 68 of female member 60. The locking mechanism defining the snap-fit connection is shown in FIG. 7. Each half is preferably of aluminium and has sufficient flex or tension to enable the snap-fit connection.

Figure 6:
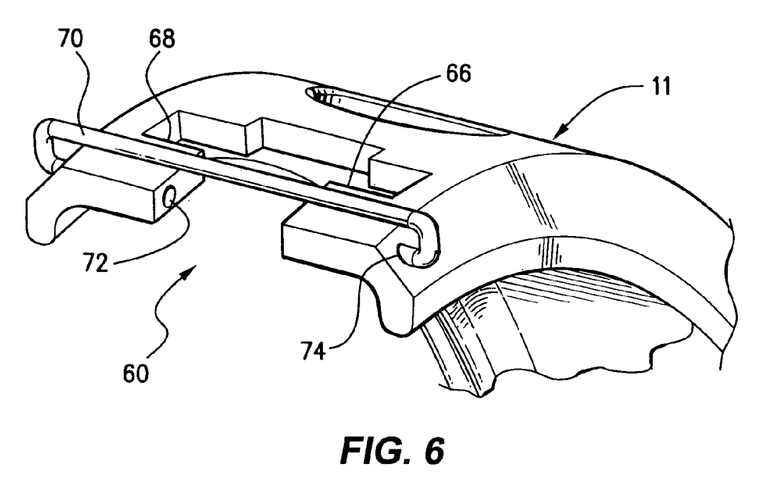
FIG. 6 is a perspective view from above of a locking pin for ensuring that the snap-fit fastener does not separate under extreme pressure.

With reference to FIGS. 6 and 7 there is shown a transverse locking pin 70 that fits within respective apertures 72, 74 in the side walls adjacent the end having the female member 60 of one or both of the halves 9, 11. The pin 70 is designed to keep each of the locking members 58 and 60 together and to prevent them from coming apart particularly due to extreme pressure brought about by the transportation of pressurised fluid within the pipes.

It is to be noted that the locking arrangement between the members 58 and 60 may be of any particular configuration that enables each of the halves to be locked to one another. Generally, these will comprise a male member and a female member that may be differently shaped. Apertures such as 74 and 76 shown in FIG. 1 may be provided in the fastener 8 primarily to reduce the weight of the fastener 8. Each of the components, being the couplers 4 and 6 and the fastener 8 together with the locking pin 70, may be made of a suitable metallic material, such as aluminium. The two halves 9, 11 of the fastener 8 are preferably made with tension such that each half is sprung to enable the snap-fit connection to take place in order to substantially prevent transverse movement between the couplers 4 and 6. Other embodiments may include more than two portions that interlock through respective locking arrangements to form the fastener 8.

In order to assemble the apparatus the user attaches coupler 4 to a respective edge of pipe 28 and secures one to the other either through welding, gluing or by thread means. The same process is applied to coupler 6 to the end of a respective pipe 30. The coupler 6 is then inserted, with the sealing rings 24 and optionally 50, into coupler 4. The fastener 8, being formed in two portions in one embodiment, is locked in place at one junction between a male member and a female member and then made to encircle the exterior surface 42 of the coupler 4. Due to the tension provided in the two halves of the fastener 8 the male member is forced to lift up over or under the leading edges of the female member until it is snap-fitted into its corresponding female member 60. The pin 70 is then inserted into its apertures in place to hold the coupler 4 to the coupler 6. In order to dismantle the apparatus 2 the reverse process is undertaken and can be assisted by using a screw driver or the like tool to be placed in the remaining section of the female member 60 not taken up by the male member 58. Then the male member 58 is gently levered outwardly so that the male member 58 protrudes out of the female member 60.

What is claimed is:

1. Apparatus for joining a first conduit to a second conduit, the first and second conduits extending in an axial direction, comprising:
   a first coupler for attachment to an end of the first conduit;
   a second coupler for attachment to an end of the second conduit and for engagement to the first, coupler;
   a snap-fit fastener for fastening the first coupler to the second coupler, the snap-fit fastener being formed of at least two identical members having one of inherent flex and tension, each identical member including:
   an inner surface and a radially spaced outer surface,
   a female end with a T-shaped slot extending radially through the member and opening out into the inner surface and the outer surface; and
   an opposite male end with a corresponding T-shaped portion which is circumferentially snap fit into the slot via one of the inner surface and the outer surface to be radially received in the T-shaped slot,
   wherein the T-shaped portion of one identical member cooperates with the T-shaped slot of the other of the at least two identical members to snap-fit and lock together therewith by action of said one of flex and tension, such that the at least two identical members, arranged male end-to-female end, fit around a periphery of the first and second couplers when the first and second couplers are engaged;
   wherein the apparatus includes a gap between the first and second couplers in the axial direction which enables relative movement between the first coupler and the second coupler, and wherein the fastener is secured around the first coupler and second coupler in a manner that permits relative circumferential movement of the fastener relative to each of the first coupler and the second coupler after assembly; wherein the first coupler is a female coupler and the second coupler is a male coupler to be received by the first coupler; and wherein at least a portion of the T-shaped portion of the male end has a thickness between the inner surface and the outer surface equal to a depth of the slot from the inner surface to the outer surface.

2. Apparatus according to claim 1 wherein each of the first coupler, the second coupler and the fastener are substantially circular in axial cross-section and adapted for joining a first and second conduit of substantially cylindrical cross-section.

3. Apparatus according to claim 1 wherein the first coupler has an internal circumferential step that sets a limit for abutment of an end of the first conduit and the second coupler has an internal circumferential step that sets a limit for abutment of an end of the second conduit.

4. Apparatus according to claim 1 such that in order to apply the fastener to the first coupler and second coupler after engagement of the first coupler to the second coupler, the at least two identical members of the fastener are initially locked through one of two locking arrangements.

5. Apparatus according to claim 4 wherein the fastener is applied by a user around the periphery of the engaged first and second couplers until the male member of the second of the two locking arrangements is next to a corresponding female member and thereafter pressure is applied to the male member of the second locking arrangement to ease the male member of the second locking arrangement one of over and under the corresponding female member until the male member of the second locking arrangement snap-fits into a slot of the corresponding female member.

6. Apparatus according to claim 5 further comprising a locking pin adapted to have each end thereof fit into at least one of the female members of the two locking arrangements and traverse the female members so as to prevent separation of each locking arrangement due to vibrations or pressure due to the transport of fluid within the first and second conduits.

7. Apparatus according to claim 1 wherein the second coupler has at least one circumferential groove for housing a respective sealing ring to prevent escape of any fluid from the first conduit and the second conduit and to absorb any vibrations created by the passage of fluid within the first and second conduits.

8. Apparatus according to claim 1 such that when the first coupler and second coupler are engaged, such engagement presents an exterior surface that has a raised portion for co-acting with an interior surface of the fastener.

9. Apparatus according to claim 8 wherein the fastener has a first depending foot portion formed at one circumferential edge of the fastener and a second depending foot portion formed at an opposite circumferential edge of the fastener, with the first depending foot portion engaging a respective shoulder on the first coupler and the second depending foot portion engaging a respective shoulder on the second coupler, to assist in the fastener securing the first coupler to the second coupler.

10. Apparatus according to claim 1 wherein the first conduit is attachable to the first coupler and the second conduit is attachable to the second coupler by any one of welding, soldering, gluing and cooperating threaded portions on the respective conduit and coupler.

\* \* \* \* \*